United States Patent
Sheth et al.

(10) Patent No.: US 9,529,858 B2
(45) Date of Patent: Dec. 27, 2016

(54) METHODS AND SYSTEMS FOR RANKING ITEMS ON A PRESENTATION AREA BASED ON BINARY OUTCOMES

(71) Applicant: Yahoo! Inc., Sunnyvale, CA (US)

(72) Inventors: Asad Sheth, Santa Clara, CA (US); Ferras Hamad, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 252 days.

(21) Appl. No.: 14/199,729

(22) Filed: Mar. 6, 2014

(65) Prior Publication Data

US 2015/0254246 A1 Sep. 10, 2015

(51) Int. Cl.
*G06F 17/30* (2006.01)

(52) U.S. Cl.
CPC ....... *G06F 17/3053* (2013.01); *G06F 17/3005* (2013.01); *G06F 17/30905* (2013.01)

(58) Field of Classification Search
CPC ............ G06F 17/3053; G06F 17/30905; G06F 17/3005; G06Q 30/02
USPC ......................................................... 707/723
See application file for complete search history.

(56) References Cited

U.S. PATENT DOCUMENTS

| | | | | |
|---|---|---|---|---|
| 5,204,813 A * | 4/1993 | Samph | ................... | G06Q 99/00 434/323 |
| 6,349,290 B1 * | 2/2002 | Horowitz | ............. | G06Q 20/108 705/35 |
| 6,865,714 B1 * | 3/2005 | Liu | ................... | G06F 17/30905 707/E17.121 |
| 7,313,134 B2 | 12/2007 | Yarlagadda | | |
| 7,472,102 B1 * | 12/2008 | Heckerman | .......... | G06Q 10/087 706/45 |
| 7,756,867 B2 | 7/2010 | Sue | | |
| 7,769,740 B2 * | 8/2010 | Martinez | ........... | G06F 17/30864 707/706 |
| 8,346,750 B2 | 1/2013 | Schachter | | |
| 8,843,477 B1 * | 9/2014 | Tirumalareddy | ....... | G06F 17/30 707/706 |

(Continued)

OTHER PUBLICATIONS

Google Search Help Forum—A way to arrange the Google Now Cards? posted on Jun. 3, 2013, 6 pages, accessed online at <https://productforums.google.com/forum/#!topic/websearch/OZv-vFPlwWh8> on Mar. 11, 2016.*

(Continued)

*Primary Examiner* — Phuong Thao Cao
(74) *Attorney, Agent, or Firm* — Martine Penilla Group, LLP

(57) ABSTRACT

A method includes accessing a number of cards from a database. The cards are ranked in the database based on a test conducted on a number of users. The cards are associated with one or more rule states. The one or more rule states provide binary outcomes of one or more rules. Each rule is identified using a code. The test is conducted by presenting different random sequences of the cards to different users and receiving inputs from the number of users. The method further includes receiving a request for a presentation area from a client device operated by a user. The presentation area is used for displaying the number of cards in an order, which is determined based on the test. The method includes providing the number of cards for display in the order within the presentation area on the client device of the user in response to the request.

23 Claims, 6 Drawing Sheets

(56) References Cited

U.S. PATENT DOCUMENTS

| | | | |
|---|---|---|---|
| 2003/0029911 A1* | 2/2003 | Kitayama | G06F 17/30905 235/100 |
| 2006/0041577 A1* | 2/2006 | Ellicott | G06F 7/36 |
| 2006/0114832 A1* | 6/2006 | Hamilton | H04L 12/2602 370/244 |
| 2007/0117072 A1* | 5/2007 | Adjali | G09B 19/0092 434/236 |
| 2008/0177825 A1 | 7/2008 | Dubinko et al. | |
| 2009/0077495 A1* | 3/2009 | Bhat | G06F 17/3089 715/811 |
| 2009/0126020 A1* | 5/2009 | Norton | G06N 5/025 726/23 |
| 2009/0254550 A1* | 10/2009 | Choi | G06F 17/30991 |
| 2009/0297121 A1* | 12/2009 | Ingrosso | H04N 5/913 386/282 |
| 2010/0287282 A1* | 11/2010 | MacLaughlin | G06Q 10/10 709/226 |
| 2010/0325079 A1* | 12/2010 | Norton | G06N 5/025 706/47 |
| 2010/0325164 A1* | 12/2010 | Norton | G06F 17/30289 707/797 |
| 2010/0332618 A1* | 12/2010 | Norton | G06N 5/025 709/219 |
| 2010/0333145 A1* | 12/2010 | Chen | G06F 9/542 725/61 |
| 2011/0071976 A1* | 3/2011 | Mutchler | G06Q 10/06 706/48 |
| 2011/0099519 A1* | 4/2011 | Ma | G06F 3/0482 715/811 |
| 2013/0110895 A1* | 5/2013 | Valentino | G06F 7/588 708/255 |
| 2013/0246383 A1* | 9/2013 | White | G06F 17/30867 707/706 |
| 2013/0347087 A1* | 12/2013 | Smith | G06F 21/36 726/7 |
| 2014/0006423 A1* | 1/2014 | Melnychenko | G06F 17/3053 707/749 |
| 2014/0032468 A1* | 1/2014 | Anandaraj | G06Q 30/02 706/46 |
| 2014/0067702 A1* | 3/2014 | Rathod | G06Q 10/10 705/319 |
| 2014/0079297 A1* | 3/2014 | Tadayon | G06K 9/00 382/118 |
| 2014/0149429 A1* | 5/2014 | Gao | G06F 17/30702 707/749 |
| 2014/0280096 A1* | 9/2014 | Gonzaga | G06F 17/30867 707/723 |
| 2014/0379703 A1* | 12/2014 | Martin | G06F 17/30315 707/723 |
| 2015/0049093 A1* | 2/2015 | Doll | G06T 13/80 345/473 |
| 2015/0106852 A1* | 4/2015 | Kritt | H04N 21/482 725/47 |
| 2015/0120712 A1* | 4/2015 | Yi | G06F 17/30053 707/723 |
| 2015/0254246 A1* | 9/2015 | Sheth | G06F 17/3053 707/728 |

OTHER PUBLICATIONS

Whitwam, R., "How to Train Google Now to Show You Better Cards", Jul. 3, 2014, 7 pages, accessed online at <http://www.greenbot.com/article/2449596/how-to-train-google-now-to-show-you-better-cards.html> on Mar. 11, 2016.*

* cited by examiner

METHODS AND SYSTEMS FOR RANKING ITEMS ON A PRESENTATION AREA BASED ON BINARY OUTCOMES

TECHNICAL FIELD

The present disclosure relates generally to methods and systems for ranking items on a presentation area based on binary outcomes.

BACKGROUND

A great deal of information is provided to people who use electronic devices, such as mobile phones, to browse the world wide web. The world wide web includes multiple web pages that include a wide variety of information, e.g., information regarding music artists, political events, music events, movies, etc. A user accesses a web page to find out about current events. However, the information on a web page is not presented in an organized manner other than the current occurrence of events. For example, two events that occur on the same day is presented simultaneously to the user regardless of whether the user is interested in the events. Users view the unorganized information but do not find the information of interest.

It is in this content that various embodiments described in the present disclosure arise.

SUMMARY

The following detailed description together with the accompanying drawings will provide a better understanding of the nature and advantages of various embodiments described in the present disclosure.

In some embodiments, a web page includes news that may be of interest to users. The news is in a form of a featured large module near a top center of the web page. The web page further includes an ordered list of articles, e.g., stories, etc., an entity that develops and manages the web page believes users will be interested. The ordered list is in the form of a long stream of stories in a central area of the web page. The web page also includes pre-selected structured data cards that serve as summary views of snapshot content from categories, e.g., sports, weather, finance, etc., along a right side of the web page, starting below an ad placement.

In various embodiments, a decision is made by the entity to provide an order of the cards on the web page based on a guess by the entity regarding wants of multiple users. This order is broadcasted to every user every time the user visits the web page. The systems and methods for ranking categories on the web page based on binary outcomes provide that when each user is shown a relevant card at a top of a list of cards each time the user visits the web page, the user finds the web page more useful than the order that is broadcasted to every user every time the user visits the web page.

In several embodiments, the cards belong to a wide range of knowledge domains, and a central team, e.g., branch, subdivision, etc., of the entity does not necessarily understand wants of a user in each of those domains in a manner in which a domain owner, e.g., a sports product manager, a weather product manager, etc., understands the wants. In these embodiments, each card presents different types of data. For example, a video card has a list of links to videos, a sports card has a series of game scores, and a weather card has forecast data. Various approaches are taken by the central team to assign relevance values to the cards. This is in contrast to the ordered list of articles in which each article has the same relevance metadata and can therefore be compared to any other article.

In various embodiments, instead of trying to fit each card into a universal description of cards where metadata is sparse for each card, the systems and methods described in the present disclosure treat each card independently. This is done by assigning a series of binary rules that guide relevance for each card.

In some embodiments, the methods include defining a rule for each feature of each card. The defining is performed by a ranking server. Once the rules are defined by the ranking server, the cards are provided by a web server for presentation on a number of client devices to a randomly selected experimental population of users. During presentation of the cards, an order of the cards is randomly selected by the ranking server for each visit to the web page for each user. Moreover, on each visit to the web page, a state of each of the rules that have been specified for a card is determined by the ranking server and recorded in a memory device of the ranking server. For each visit, it is determined and recorded by the ranking server in a memory device of the ranking server whether or not that visit resulted in a relevance event. Examples of a relevance event include a click by a user, or a hover by the user, or a view by the user, or a combination thereof.

After gathering by the ranking server of a large number of samples of these page views by users, in some embodiments, selections, e.g., clicks, hovers, etc., are modeled by position by the ranking server in a column in which the cards are presented on the web page to determine how a position of a card biases a likelihood that a relevance event will occur. For example, a click on one of the cards in an eighth position, e.g., slot, etc., from a top of a column of the web page is about three times less likely than a click on another one of the cards in a first position from the top in the column. In this example, when observing relevance events, relevance events that occur for the card in the eighth position are about three times as much as relevance events for the card in the first position. Moreover, after gathering the large number of samples, a series of rule states to relevance event likelihood mappings is determined by the ranking server. For example, for each card, a mapping between total page views per card per rule state and total relevance events per card per rule state is determined. With the latter as a numerator and the former as a denominator, a normalized relevance score is determined by the ranking server for each card in a given rule state.

In some embodiments, the ranking server does not consider a meaning of a rule while receiving and recording a relevance event or while ranking a card. For example, the ranking server does not parse a rule to determine an English meaning of the rule. In this example, the ranking server does not determine a domain of a card. It takes time and cost to determine the domain of a card.

In some embodiments, a method includes accessing a number of cards from a database. The cards are ranked in the database based on a test conducted on a number of users. The cards are associated with one or more rule states. The one or more rule states provide binary outcomes of one or more rules. Each rule is identified using a code. The test is conducted by presenting different random sequences of the cards to different users and receiving inputs from the number of users. The method further includes receiving a request for a presentation area from a client device operated by a user. The presentation area is used for displaying the number of cards in an order, which is determined based on the test. The method includes providing the number of cards for display in the order within the presentation area on the client device of the user in response to the request.

In various embodiments, a method for arranging a plurality of cards is described. The method includes receiving the plurality of cards. Each card has multimedia content to be displayed on a presentation area. The multimedia content has one or more features. The cards are associated with one or more rules. The method further includes sending to arrange the plurality of cards on the presentation area in a random order for a plurality of users that are capable of viewing the cards arranged in a user-specific order. The random order is different for different users. The method includes identifying user interactivity with the features of any one of the cards. The interactivity with one of the features in one of the cards sets a binary outcome for the card. The method includes sending for display the plurality of cards ordered in accordance with a ranking defined based on the binary outcomes for the plurality of cards. The method is executed by a processor.

In various embodiments, a method for arranging a plurality of categories on a presentation area is described. The method includes receiving the categories, which are to be presented on a presentation area. One of the categories is different than another one of the categories. Each category includes a presentation of a combination of features. The categories are associated with a number of combinations of binary outcomes of a number of combinations of rules. The method includes sending for display to a number of client devices the categories. Each category is associated with a corresponding one of the combinations of binary outcomes. The method further includes determining a number of the client devices from which indications of relevance actions are received when the categories based on the combinations of binary outcomes are presented on the client devices and ranking the categories for presentation on the presentation area based on the number of client devices from which the indications of the relevance actions are received. The method is executed by a processor.

In some embodiments, a server includes a memory device for storing a computer program. The server further includes a processor coupled to the memory device for retrieving the computer program from the memory device and executing the computer program. The processor executes the computer program for receiving a plurality of cards. Each card has multimedia content to be displayed on a presentation area. The multimedia content has one or more features. The cards are associated with one or more rules. The processor further executes the computer program for sending the plurality of cards for arrangement on the presentation area in a random order for a plurality of users that are capable of viewing the cards arranged in a user-specific order. The random order is different for different users. The processor also executes the computer program for identifying user interactivity with the features of any one of the cards. The interactivity with one of the features in one of the cards sets a binary outcome for the feature of the card. The processor executes the computer program for sending for display the plurality of cards ordered in accordance with a ranking defined based on the binary outcomes for the plurality of cards.

DETAILED DESCRIPTION

The following example embodiments and their aspects are described and illustrated in conjunction with apparatuses, methods, and systems for ranking categories on a presentation area based on binary outcomes. The embodiments and their aspects are meant to be illustrative examples and not limiting in scope.

Figure 1:
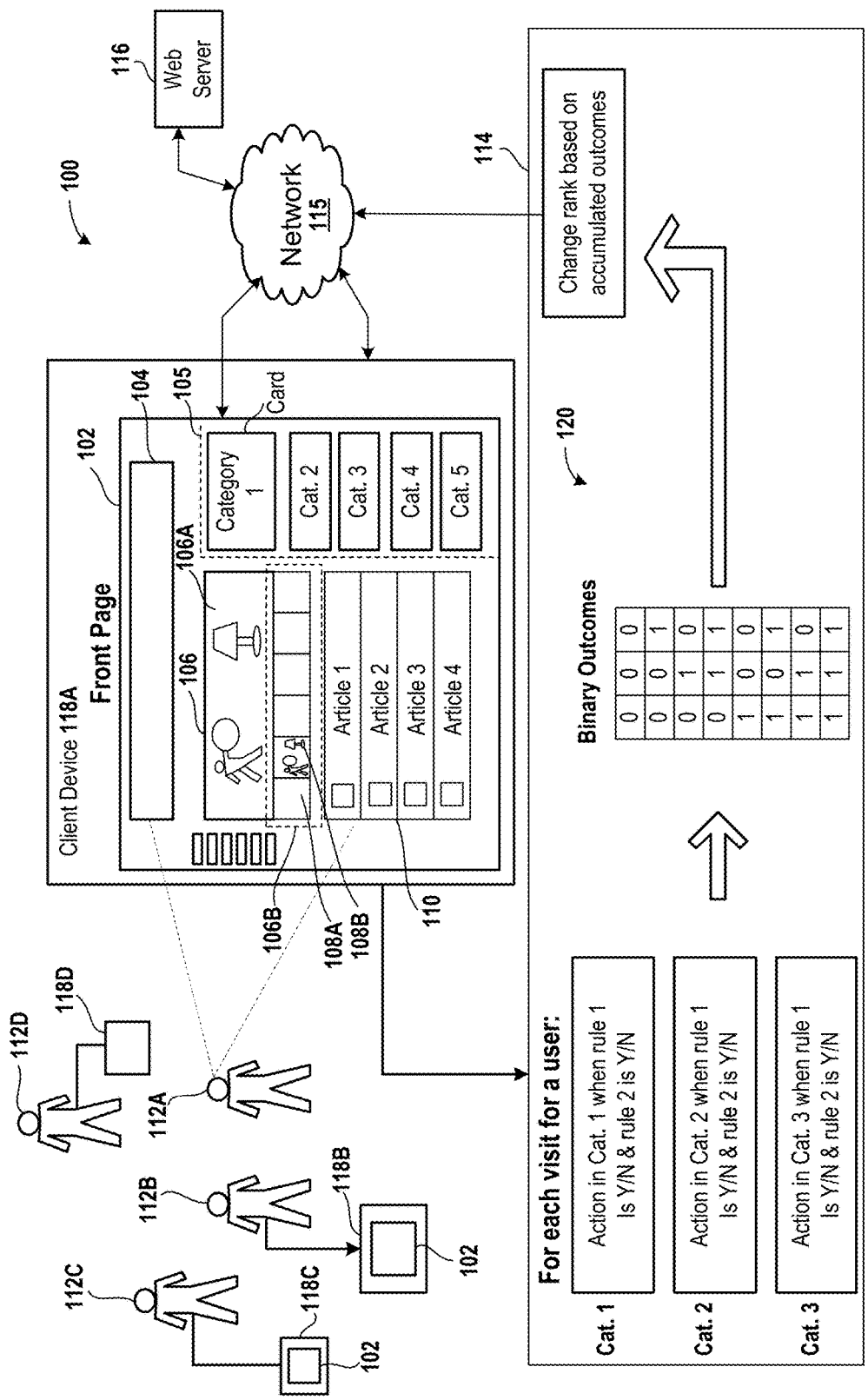
FIG. 1 is a diagram of a system for arranging categories on a presentation area based on relevance actions performed by users, in accordance with some embodiments described in the present disclosure.

FIG. 1 is a diagram to illustrate an embodiment of a system 100 for arranging categories on a presentation area, e.g., a web page 102, a presentation area within a mobile application, etc., based on relevance actions performed by users. Examples of the web page 102 include a home page. For example, the home page is managed by an entity, e.g., a corporation, a partnership, etc. The home page is a page on a website. In some embodiments, the home page is a main or introductory or front web page of a website. In various embodiments, the home page is a page that opens when a web browser is opened. For example, when the web browser is accessed by a user via an input device of a client device, a request for the home page is sent from the client device to a web server 116. Upon receiving the request, the web server 116 sends the web page 102 to the client device for display on the client device.

The web page 102 is identified by a uniform resource locator (URL). The website is a set of related web pages served from a single web domain. The website is hosted on the web server 116, accessible via a network 115. Examples of the network 115 include a wide area network (WAN), a local area network (LAN), a proprietary network, or a combination thereof, etc. To illustrate the network 115 includes the Internet, an Intranet, or a combination thereof.

The web page 102 is a document and is transported from the web server 116 to a client device, e.g., a client device 118A, a client device 118B, a client device 118C, etc., by using a protocol, e.g., a hypertext transfer protocol (HTTP). Examples of a client device include a desktop computer, a laptop computer, a tablet, a cell phone, a smart phone, etc.

A computer application, e.g., a web browser, etc., that is executed on a client device renders content of the web page 102 according to formatting instructions, e.g., hypertext markup language (HTML) instructions, etc., onto a display device of the client device. A display device is further described below.

The web page 102 includes an advertisement 104 displayed on top of the web page 102. The web page 102 further includes a carousel 106 that has a top part 106A and a bottom part 106B. Examples of the top part 106A include a module, which is a part of a computer program that contains one or more computer software routines. In some embodiments, a module of a software program can be developed independent of other parts of the software program. The bottom part 106B includes multiple stories 108A and 108B. Each story, as described in the present disclosure, includes content, e.g., multimedia content, text, audio, video, images, photos, etc. Examples of the multimedia content include a combination of any two of audio, video, text, images, and animation. In some embodiments, a story provides news to a user. For example, a story provides a visual image of a real life event that has occurred. When a selection is received from a user 112A via an input device of the story 108B, the top portion 106A displays the story 108B. For example, a larger version of the story 108B is displayed in the top portion 106A.

In some embodiments, each story has a heading, e.g., a title, etc., which is followed by a brief description of the story and/or information regarding a publisher of the story. Examples of the information regarding the publisher include a name of the publisher, a city in which the publisher has its main office, a place of incorporation of the publisher, etc.

Below the carousel 106 is a stream 110. The stream 110 includes multiple articles 1, 2, 3, and 4. Each article includes a story. Some stories in the stream 110 are the same as some of the stories 108A and 108B of the carousel 106.

When a selection is received from the user 112A via the input device of a hyperlink within a story, a web page that provides details of the story instead of a brief description of the story is displayed on the display device of the client device 118A.

A list of categories 1, 2, 3, 4, and 5 is displayed on the right, e.g., in a right column 105, etc., on the web page 102. The list of categories 1 thru 5 is displayed in a random order. For example, a ranking server 114 of the system 100 includes a random number generator (RNG) that generates a random sequence of numbers, e.g., 1 thru 5, etc., and the sequence provides a vertical order of arrangement of the categories 1 thru 5 in the column 105 on the web page 102. The random sequence of numbers is generated to perform a test on one or more of the users 112A, 112B, and 112C to determine a relevance score.

In some embodiments, the ranking server 114 provides a different random order of arrangement of the categories 1 thru 5 for each user 112A, 112B, and 112C. For example, the ranking server 114 assigns a first random order of arranging the categories 1 thru 5 for the client device 118A and a second random order of arranging the categories 1 thru 5 for the client device 118B. The first random order arranges the category 1 on top of the category 2 and the second random order arranges the category 2 on top of the category 1. In various embodiments, the ranking server 114 assigns the first random order of arranging the categories 1 thru 5 for a user account of the user 112A and the second random order for a user account of the user 112B. For example, when the user 112A logs into his/her user account via a client device and then accesses the web page 102, the category 1 is displayed on top of the category 2, and when the user 112B logs into his/her user account via a client device and then accesses the web page 102, the category 2 is displayed on top of the category 1. Examples of user accounts are provided below.

In various embodiments, a number of a random sequence is unknown to the random number generator before generating the number.

The categories 1 thru 5 are different from each other. For example, the category 1 is different from the categories 2 thru 5. Examples of any of the categories 1 thru 5 include a finance category, a weather category, a photos category, a videos category, a sport category, a horoscopes category, a birthdays category, and a comics category, etc. For example, the category 1 is a weather category and the category 2 is a finance category. As another example, subject matter of the category 1 is different from subject matter of the category 2. To illustrate, the category 2 includes information about stocks, wall street, stock markets, etc. and the category 1 includes information about temperature in a city during a day, chance of rain in the city during the day, temperature in the city during a next day, chance of rain in the city during the next day, etc. As another illustration, the category 3 includes scores of playoffs conducted by a sports association, e.g., a basketball association, a baseball association, a football association, a soccer association, etc., and the category 4 includes images of scenic places in the world. To illustrate further, the category 5 includes links to videos and a category 6 (not shown) includes birthdays of social network friends of the user. In various embodiments, the birthdays are displayed when the user 112A logs into his/her social network account via the web page 102 and provides permission to the entity that manages the web page 102 to access the birthdays from the social network. As another illustration of the different categories, a category 7 (not shown) includes horoscopes of people whose birthdays fall in a current month in which the web page 102 is displayed on the client device 118A and a category 8 (not shown) includes images of a cartoon of comics. It is difficult for a server to compare the categories 1 thru 5 with each other without implementing the systems and methods for ranking, described herein. For example, without application of the systems and methods for ranking described herein, the categories 1 thru 5 are ranked equally.

In some embodiments, a category is a card that is displayed on the display device of the client device 118A. Each card includes a close selector, e.g., selector represented as "X", etc., to receive a close selection from a user via an input device of a client device to close the card on the web page 102. Upon receiving the close selection, a prompt to save the close selection in a user account is displayed by a client device. For example, when a user logs into his/her user account and then provides the close selection via an input device to a processor of a client device, the processor sends the close selection preference to the web server 116. The web server 116 associates the close selection preference to the user account. Next time, when the user logs into his/her user account, the web server 116 sends the web page 102 for display with the card closed. When the user selects the close selection on the closed card via an input device of a client device, the closed card is reopened on the web page 102.

In some embodiments, each card is stored in a database within a memory device of a server, the web server 116, the ranking server 114, etc.

In various embodiments, each card is displayed by executing a corresponding computer application. For example, a Finance branch of an entity is in charge of developing and managing a computer program that is executed by a processor of the web server 116 to determine a format of presenting, e.g., displaying, etc., information regarding a finance card. As another example, a sports branch of an entity is in charge of developing and managing a computer program that is executed by a processor of the web server 116 to determine a format of presenting information regarding a sports card. Examples of format of a card include a position of the card on the web page 102, a color of the card on the web page 102, a texture of the card on the web page 102, a shade of the card on the web page 102, a format of features of the card on the web page 102, etc.

In various embodiments, different servers are used to determine formats of displaying information about different cards. For example, a first web server is used to determine a format of displaying information about the finance card and a second web server is used to determine a format of presenting information about the sports card.

For each visit of the web page 102 by one or more of the users 112A, 112B, and 112C during the test, the ranking server 114 determines whether a number of relevance actions are performed by one or more of the users 112A, 112B, and 112C with respect to the category 1 when the category 1 is displayed on a corresponding one or more of the client devices 118A, 118B, and 118C based on a combination of outcomes of a combination of rules, e.g., a rule 1 and a rule 2, etc., assigned to the category 1 by the ranking server 114. In various embodiments, the category 1 includes features 1 and 2. The feature 1 of category 1 is sent by the web server 116 for display in a first manner, e.g., format, etc., on the display device of the client device 118A when the ranking server 114 determines that an outcome of application of a rule 1 of the category 1 is true and the feature 2 of category 1 is sent by the web server 116 for display on the display device of the client device 118A in a first manner when the ranking server 114 determines that an outcome of application of a rule 2 of the category 1 is true. On the other hand, the feature 1 of category 1 is sent by the web server 116 for display in a second manner on the display device of the client device 118A when the ranking server 114 determines that an outcome of application of the rule 1 of the category 1 is false and the feature 2 of category 1 is sent by the web server 116 for display in a second manner on the display device of the client device 118A when the ranking server 114 determines that an outcome of application of the rule 2 of the category 1 is false. An example of display of the feature 1 of the category 1 in the first manner includes a display that is not grayed out and an example of display of the feature 1 of the category 1 in the second manner includes a display that is grayed out. Another example of display of the feature 2 of the category 1 in the first manner includes a display that is highlighted and an example of display of the feature 2 of the category 1 in the second manner includes a display that is not highlighted. The feature 1 of category 1 is displayed on the user device 118A to convey to the user 112A the outcome of the rule 1 of category 1 and the feature 2 of category 1 is displayed on the user device 118A to convey to the user 112A the outcome of the rule 2 of category 1. For example, the feature 1 of category 1 conveys to the user 112A that "U.S. markets are closed" when the U.S. stock markets are closed and the feature 2 of category 1 conveys to the user 112A that "U.S. markets are open" when the U.S. stock markets are open.

In some embodiments, each rule is a query associated with an environment. For example, a rule includes whether the stock market, e.g., a stock market environment, etc., is open. As another example, a rule includes whether weather conditions are good. As yet another example, a rule includes whether a sport is being played at a location of a user. Whether a sport is being played at a location is an example of a condition. As another example, a rule includes whether a scenic image is created and ready for presentation on the web page 102. Whether the scenic image is created and ready for presentation on the web page 102 is an example of an image condition. As still another example, a rule includes whether today, e.g., a day on which the user 112A visits the web page 102 on his/her client device 118A, is a birthday of the user 112A or his/her social network friends. Whether the birthday of the user 112A or his/her social network friends is today is an example of a birthday condition. As another example, a rule includes whether a horoscope is ready for presentation on the web page 102 for a month during which the user 112A accesses the web page 102 via his/her client device 118A. Whether the horoscope is ready for presentation on the web page 102 is an example of a horoscope condition. As another example, a rule includes a query whether the user 112A is less than 20 years old on a day the user 112A accesses the web page 102 via his/her client device 118A. Whether the user 112A is less than 20 years old on a day the user 112A accesses the web page 102 is an example of a comics condition.

In several embodiments, instead of sending the feature 1 of the category 1 for display in the second manner and instead of sending the feature 2 of the category 1 in the second manner, the feature 1 of category 1 is not sent by the web server 116 for display on the display device of the client device 118A when the ranking server 114 determines that an outcome of application of the rule 1 of the category 1 is false and the feature 2 of category 1 is not sent by the web server 116 for display on the display device of the client device 118A when the ranking server 114 determines that an outcome of application of the rule 2 of the category 1 is false.

In various embodiments, whether or not a feature is displayed within a category is independent of an outcome of an application of a number of rules that is associated with the category. As an example, the features 1 and 2 are not displayed within the category 1 independent of an outcome of the rules 1 and 2 of the category 1. For example, the category 1 includes or does not include a feature that indicates that the U.S. markets are open. In this example, the category 1 is displayed on a display device of the client device 118A when a binary outcome of a first rule is that the U.S. markets are open, when a binary outcome of a second rule is that the user 112A is greater than 22 years old, and when a binary outcomes of a third rule is that a change is a portfolio of the user 112A is less than 5% between yesterday and today, which is the day on which the web page 102 is accessed by the client device 118A. In this example, whether the U.S. stock markets are open, whether the user 112A is greater than 22 years old, and whether the portfolio of the user 112A is changed less than 5% are examples of rules that are associated with the category 1. In these embodiments, a rule is evaluated to determine a binary outcome of the rule by the ranking server 114, which is a backend server, and the feature is or is not displayed on the client device 118A.

In some embodiments, the ranking server 114 determines an outcome of a rule based on input received from a user or from a database. For example, the ranking server 114 accesses a weather database that stores information about the weather to determine whether it will rain today, which is the day on which the web page 102 is accessed by the user 112A on the client device 118A, or tomorrow. Upon receiving information from the weather database that it will rain tomorrow, an outcome of a rule whether it will rain tomorrow is true. On the other hand, upon receiving information from the weather database that there is no or little chance of rain tomorrow, an outcome of a rule whether it will rain tomorrow is false. As another example, the ranking server 114 receives an input from the user 112A via an input device of the client device 118A to determine user demographics, e.g., whether the user 112A is older than 22 years, or is a male or a female, or is interested in weather, or has studied in a college, or has studied at a university, or a combination thereof. Upon receiving an input from the user 112A that the user is older than 22 years, an outcome of a rule as to whether the user 112A is older than 22 years is true. On the other hand, upon receiving an input from the user 112A that the user is not older than 22 years, an outcome of a rule as to whether the user 112A is older than 22 years is false.

Examples of a feature include text, or an image, or a video, or an audio, or an animation, or a hyperlink, or a combination thereof. To illustrate, a feature includes text that is hyperlinked to a web page that provides details about a story. In this illustration, the text is a title of the story. As another illustration, a feature includes a hyperlink to a video. As yet another illustration, a feature includes a thumbnail image that includes a hyperlink to an increased-size version of the thumbnail image. In some embodiments, the increased-size version occupies an entire area of a screen, e.g., full screen area, etc., of a display device of a client device. In several embodiments, the increased-size version occupies a portion of an area of a screen of a display device of a client device and is larger than the thumbnail image.

An example of the relevance action with respect to a category includes a hovering relevance action in which the user hovers a mouse pointer, e.g., a cursor, etc., on top of or close to, e.g., adjacent to, etc., a feature of the category. An example of a hover includes a mouse over. Another example of a relevance action with respect to a category includes a clicking relevance action in which the user selects a feature of the category after placing a mouse on top of the feature. In some embodiments, upon receiving the selection of a feature of a category, the web server 116 serves a web page that describes the feature in detail and/or that provides an increased-size version of the feature and/or that describes other features or stories that are in the same category as that of the feature. For example, upon receiving a selection of an image of a comic, the web server 116 serves images of the comic published on the web page 102 for a current date on which the selection is received and further servers images of a comic published on the web page 102 for dates previous to the current date. Yet another example of a relevance action with respect to a category includes viewing, e.g., focusing, staring, looking, etc., at a feature of the category. To illustrate, the ranking server 114 determines that a relevance action has occurred with respect to a category when the user 112A looks at a feature within the category for more than a pre-determined period of time, e.g., stares at the feature, etc. Still another example of a relevance action with respect to a category includes a combination of hovering over, selecting, and viewing a feature of the category. A relevance action performed by a user is an example of an input from the user.

Moreover, for each visit of the web page 102 by the users 112A, 112B, and 112C during the test, the ranking server 114 determines whether a relevance action is performed by one or more of the users 112A, 112B, and 112C with respect to the category 2 when the category 2 is generated based on a combination of binary outcomes of a number of rules, e.g., rules 1 and 2 assigned by the ranking server 114 to the category 2, etc. Also, for each visit of the web page 102 by the users 112A, 112B, and 112C, the ranking server 114 determines whether a relevance action is performed by one or more of the users 112A, 112B, and 112C with respect to the category 3 when the category 3 is generated based on a combination of binary outcomes of a number of rules, e.g., rules 1 and 2 assigned by the ranking server 114 to the category 3, etc.

For each category 1 thru 5 of the web page 102, the ranking server 114 determines a number of users 112A, 112B, and 112C that performed the relevance action with respect to the category. The user 112A operates the client device 118A, the user 112B operates the client device 118B, and the user 112C operates the client device 118C. For example, the ranking server 114 determines that the user 112A from all the users 112A thru 112C selected the feature 1 of the category 1 and did not select the features of the remaining categories 2 thru 5 displayed on the web page 102 to determine that the user 112A performed a relevance action with respect to the category 1. The user 112A selected the feature 1 of the category 1 on the web page 102 displayed on the client device 118A to generate a relevance event, e.g. a selection event, etc. The users 112B and 112C visited the web page 102 and did not select any feature of the category 1. The user 112B visited the web page 102 displayed on the client device 118B and the user 112C visited the web page 102 displayed on the client device 118C. As another example, the ranking server 114 determines that the users 112B and 112C from all the users 112A thru 112C selected the feature 1 of the category 2 and did not select the features of the remaining categories 1 and 3 thru 5 displayed on the web page 102. In this example, the ranking server 114 determines that two relevance events are generated with respect to the category 2 from two relevance actions of the users 112B and 112C with respect to the category 2. The relevance actions include selections of the feature 1 of the category 2 by the users 112B and 112C. The user 112B selected the feature 1 of the category 2 on the web page 102 displayed on the client device 118B and the user 112C selected the feature 2 of the category 2 on the web page 102 displayed on the client device 118C. The user 112A visited the web page 102 on the client device 118A and did not select any features of any of the categories 2 thru 5 during the visit.

All possible binary outcomes, e.g., 1 or 0, true or false, etc., for a combination of rules of a category that are applied by the ranking server 114 is shown in a table 120, which is stored in a memory device of the ranking server 114. For example, a row of binary outcomes "0, 0, 0" that are determined by the ranking server 114 indicates it is false that the user 112A is greater than 22 years old, it is false that a portfolio of the user 112A changed greater than 5% between today and yesterday, and it is false that the U.S. markets are open. In this example, the rules whether the user 112A is greater than 22 years old, whether the portfolio of the user 112A changed greater than 5% between today and yesterday, and whether the U.S. markets are open are applied by the ranking server 114 to determine binary outcomes of the rules. Moreover, in this example, the rules are assigned to a category. As another example, a row of binary outcomes "0, 0, 1" that are determined by the ranking server 114 indicates it is false that the user 112A is greater than 22 years old, it is false that a portfolio of the user 112A changed greater than 5% between today and yesterday, and it is true that the U.S. markets are open.

The ranking server 114 determines and assigns for each category 1 thru 5, the relevance score, which is a ratio of a number of relevance actions performed by the users 112A, 112B, and 112C with respect to the category to a number of visits of the web page 102 by the users 112A, 112B, and 112C. In some embodiments, the number of page visits of the web page 102 is equal to the number of users 112A, 112B, and 112C when each user 112A, 112B, and 112C visits the web page 102 once. For example, the ranking server 114 determines that for the category 1, a relevance score is ⅓ by determining that out of the three users 112A, 112B, and 112C, each of whom visited the web page 102 once, the user 112A performed a relevance action with respect to the category 1. When the users 112A, 112B, and 112C visited the web page 102, the category 1 displayed the features 1 and 2 of the category 1. As another example, the ranking server 114 determines that for the category 2, a relevance score is ⅔ by determining that out of the three users 112A, 112B, and 112C, each of whom visited the web page 102 once, two users 112B and 112C performed a relevance action with respect to the category 2. When the users 112A, 112B, and 112C visited the web page 102, the category 2 displayed the features 1 and 2 of the category 2.

The ranking server 114 ranks the categories 1 thru 5 on the web page 102 based on the relevance scores. For example, upon determining that the relevance score of the category 2 is greater than the relevance score of the category 1, the ranking server 114 ranks the category 2 to be above the category 1 on the web page 102. The ranking server 114 sends an instruction to the client devices 118A, 118B, and 118C to arrange the category 2 to be above the category 1. In some embodiments, the ranking server 114 sends an instruction to the web server 116 to rank the categories 1 thru 5 based on a rank determined by the ranking server 114. Upon receiving the instruction, the web server 116 re-arranges the categories 1 thru 5 based on the ranks received from the ranking server 114 and provides the re-arranged categories 1 thru 5 to one or more of the client devices 118A, 118B, and 118C for display. In various embodiments, instead of or in addition to arranging the category 2 above the category 1, the ranking server 114 instructs to change a format, e.g., color, texture, shade, etc., of the category 2 when the category 2 is in a top position between positions of the category 1 and category 2. The change is made compared to the category 1 to highlight the category 2 compared to the category 1 on the web page 2.

After the test, e.g., after the relevancy scores are determined for the categories of the web page 102, etc., the changed order of categories is presented on the web page 102 to one or more of the users 112A, 112B, and 112C, or to another user 112D, who accesses the web page 102 with the changed order via a client device 118D. For example, the ranking server 114 sends the ranking generated based on the relevancy scores to the web server 116. When the user 112D requests the web page 102 from the web server 116, the web server 116 provides the web page 102 with a re-arranged order of categories based on the ranking via the network 115 to the client device 118D of the user 112D.

In some embodiments, in which categories are accessed on a mobile application of a mobile device, the user 112D accesses the mobile application on the client device 118D via an input device of the client device 118D. The mobile application is received from a mobile application server via the network 115 and stored on a mobile device. Examples of a mobile device are provided below. Upon accessing the mobile application, categories that are re-ranked are provided from the ranking server 114 or another server to the client device 118D for display within the mobile application. The mobile application is executed by a processor of a client device to display the re-arranged categories on a display device of the client device 118D. Similarly, in some embodiments, the re-arranged categories are presented with corresponding mobile applications that are accessed by a corresponding one of client devices 118A thru 118C of the one or more users 112A thru 112C.

It should be noted that the re-ranking of the categories, e.g., moving the category 2 to the top compared to the category 1, etc., is performed when each category 1 and 2 has the same combination of features as that before the re-ranking is performed. For example, the category 1 has the same combination of features before and after the re-ranking from the top position of the category 1 to position lower than the category 2. As another example, the category 2 has the same combination of features before and after the re-ranking from a position lower than the category 1 to the position above the category 1.

In various embodiments, the test is performed with respect to any number of users and results of the test, e.g., re-arrangement of categories, are applied to any number of users.

In some embodiments, instead of on the top, the advertisement 104 is displayed on another area, e.g., bottom, right, center, left, etc., of the web page 102.

It should be noted that a bottom of the web page 102 is below the center of the web page 102 and a top of the web page 102 is above the center of the web page 102. Moreover, a right side of the web page 102 is to the right of the center of the web page 102 and a left side of the web page 102 is to the left of the center of the web page 102.

In various embodiments, the web page 102 does not include the advertisement 104.

In some embodiments, the bottom part 106B includes any number of stories.

In several embodiments, all stories of the stream 110 are different from all stories of the carousel 106.

In various embodiments, instead of the categories 1 thru 5 being displayed in the column 105 on the web page 102, the categories 1 thru 5 are displayed in a row on the web page 102 or in any other arrangement, e.g., diagonal, zig-zag, linear, curved, etc., on the web page 102.

In several embodiments, the stream 110 includes a number of articles.

In various embodiments, the web page 102 includes any number of categories. In several embodiments, the categories 1 thru 5 are displayed on another area, e.g., bottom, left, center, top, etc. of the web page 102.

In some embodiments, a card has a rectangular shape, or a square shape, or a polygonal shape, or an oval shape, or a circular shape, or a zigzag shape, or a curved shape. In various embodiments, a card has a bounded shape that is bounded by a number of lines, or a number of curves, or a combination thereof.

Although the embodiments described in the present disclosure are described with respect to a server, in some embodiments, instead of a server, multiple servers are used. In various embodiments, instead of a server, a virtual machine is used.

In various embodiments, instead of a true outcome, an outcome is represented as a "1" and instead of a false outcome, an outcome is represented as a "0".

In some embodiments, a category includes any number of features.

In several embodiments, a number of users that perform a relevance action with respect to a feature of a category on the web page 102 is determined by the ranking server 114 by determining a number of different user accounts logged into to perform the relevance action. For example, when the user 112A logs into a first user account to perform a relevance action with respect to a feature on the web page 102 and logs into a second user account to perform a relevance action with respect to the feature on the web page 102, the ranking server 114 determines that two users have performed the relevance action with respect to the feature. It should be noted that the relevance actions performed by the user 112A are independent of a number of client devices that are operated by the user 112 to log into the user accounts and to perform the relevance actions.

Figure 2:
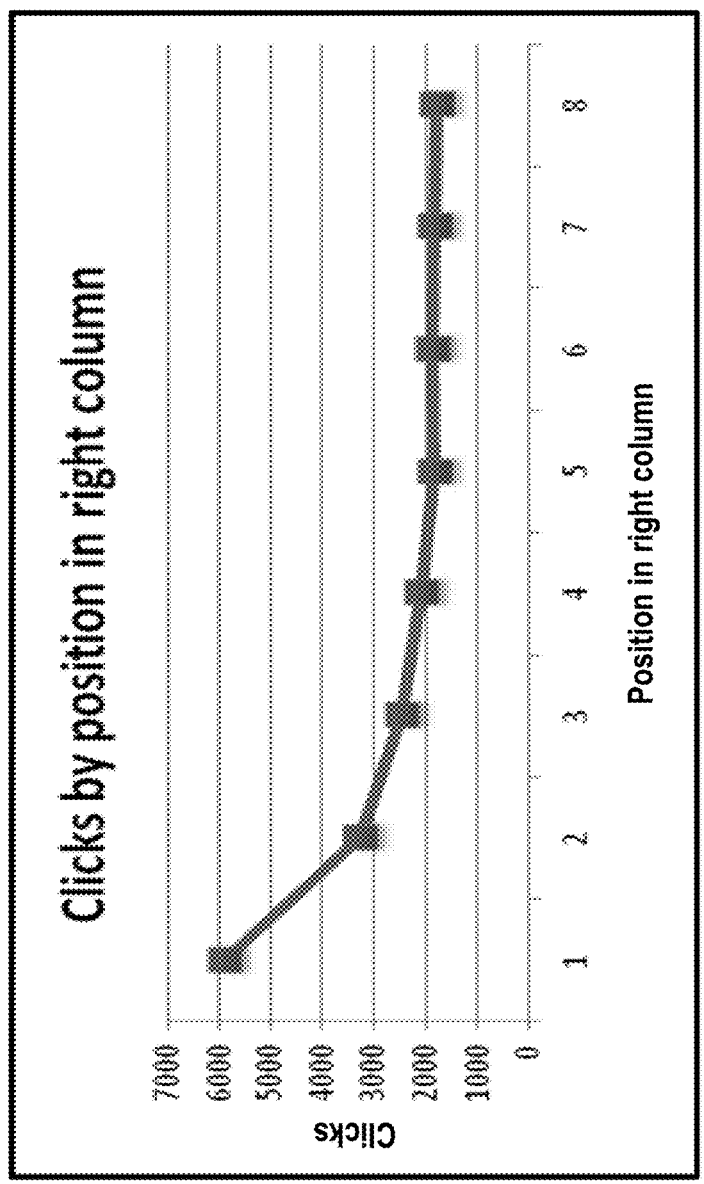
FIG. 2 shows a graph of a number of clicks received from users versus a position of a category in a column on a web page to illustrate that a selection of a lower position of a category on the web page is provided a higher weight than that provided to a selection of a higher position of a category on the web page, in accordance with several embodiments described in the present disclosure.

In some embodiments, during the test, the ranking server 114 assigns a weight to a relevance score based on a position of one of the categories 1 thru 5 among all the categories 1 thru 5 on the web page 102 and based on whether a relevance action is performed with respect to the one of the categories 1 thru 5. For example, the ranking server 114 assigns a higher weight to a relevance score of the category 2 that is below the category 1 than a weight assigned to a relevance score of the category 1. As another example, the ranking server assigns a higher weight to a relevance score of the category 3 that is below the category 2 than a weight assigned to a relevance score of the category 2. As another example, a weight assigned to a relevance score of the category 8 is exponentially higher than a weight assigned to a relevance score of the category 2. As shown in FIG. 2, as a position of a category becomes lower vertically on the web page 102, the category becomes less likely to receive a selection from a user. FIG. 2 plots a number of clicks received from users versus a position of a category in a column on the web page 102. To account for the less likelihood of being selected, the weight assigned to the category 8 is exponentially higher than a weight assigned to the category 2. As another example, a weight assigned to a relevance score of the category 3 is linearly greater than a weight assigned to a relevance score of the category 2. In various embodiments, instead of a linear or an exponential function, any other mathematical function that is increasing with a decrease in position of a category from multiple positions of categories on the web page 102 is used. In these embodiments, a weighted relevance score, which is a multiple of a relevance score and a weight assigned to the relevance score, is used by the ranking server 114 to rank the categories 1 thru 5. For example, upon determining that the category 4 has a higher weighted relevance score than a weighted relevance score of the category 3, the ranking server 114 determines to rank the category 4 to be higher than a rank of the category 3 and sends an instruction to the client devices 118A, 118B, and 118C to display the category 4 above the category 3 and/or highlighted with respect to the category 3.

In various embodiments, the ranking server 114 receives the categories 1 thru 5 from the web server 116 upon requesting the web server 116 from the categories. Before the categories 1 thru 5 are received by the ranking server 114, the categories 1 thru 5 are randomly displayed on the web page 102 for different users 112A, 112B, and 112C. In some embodiments, before the categories 1 thru 5 are received by the ranking server 114, the categories are displayed in an order generated based on ranking performed by the ranking server 114.

Figure 3:
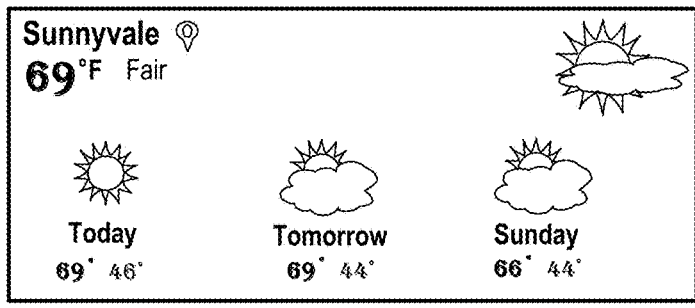
FIG. 3 is a diagram of multiple cards, in accordance with various embodiments described in the present disclosure.

FIG. 3 is a diagram of an embodiment of multiple cards C1, C2, C3, and C4. The card C1 has a category of weather. The card C1 is displayed on the web page 102 and displays current temperature in Sunnyvale, Calif. Moreover, the card C1 includes a range of temperatures for a current day on which the web page 102 having the card C1 is visited by one or more of the users 112A, 112B, and 112C. The card C1 further includes a range of temperatures for a day next to the current day and a day next to the next day.

The card C2 has a category of finance. The card C2 displays a value of S&P500™ stock market index on the current day, a value of NASDAQ™ composite index on the current day, and a value of Dow Jones™ Industrial Average index on the current day, a percentage change in the S&P500™ on the current day, a percentage change in the NASDAQ™ composite index on the current day, and a percentage change in the Dow Jones™ Industrial Average index on the current day. The card C2 also includes a field in which one of the users 112A, 112B, and 112C enter via an input device of a corresponding one of the client devices 118A, 118B, and 118C a ticker symbol of a stock to receive a value of the stock on the current day. Upon receiving the ticker symbol, the web server 116 (FIG. 1) sends a web page that includes additional finance information, e.g., full name of an entity having the ticker symbol, a 52 week high to low range of values of a stock having the ticket symbol, whether the company provides a dividend, etc., to one of the client devices 118A, 118B, and 118C from which the ticker symbol is received.

The card C3 has a category of sports. The card C3 lists two scores, one for a basketball game of Houston's basketball team versus Oakland's basketball team and another for a game of Denver's basketball team versus Milwaukee's basketball team. The card C3 further includes a field in which one of the users 112A, 112B, and 112C enter via an input device of a corresponding one of the client devices 118A, 118B, and 118C a team name. Upon receiving the team name, the web server 116 (FIG. 1) sends a web page that includes a play schedule of a team having the team name to one of the client devices 118A, 118B, and 118C from which the team name is received.

The card C4 has a category of photos. Various images are includes in the card C4. Upon receiving a selection of one of the images in the card C4 from one of the client devices 118A, 118B, and 118C, the web server 116 sends an increased size version of the image for display on the one of the client devices 118A, 118B, and 118C.

In various embodiments, the card C1 includes temperatures for any number of days or for another time frame, e.g., current month, next month, etc. In some embodiments, instead of or in addition to temperature, the card C1 includes other weather information, e.g., chance of rain, chance of snow, chance of a storm, chance of a tsunami, etc.

In some embodiments, the card C2 includes other information about finance, e.g., information regarding personal investing, 401K information, retirement planning information, futures stock market information, currency stock market information, information regarding mutual funds, information regarding exchange traded funds, options stock market information, etc.

In several embodiments, the card C3 includes information about other sports, e.g., badminton, volleyball, soccer, football, etc. In various embodiments, the card C3 includes information about other basketball leagues, e.g., National College Athletic Association league, local basketball leagues in Sunnyvale, Calif., etc.

In some embodiments, the card C4 includes any number of images or photos or pictures.

Tables 1 thru 10 below are used to illustrate a method for assigning relevance scores to categories of the web page 102 (FIG. 1). Table 1 shows examples of various rules of the finance card, which is a card that includes finance information and is included on the web page 102.

TABLE 1

| Rule Description | Rule Shorthand | Logged Value/Code |
|---|---|---|
| % change of an individual quote in the user's portfolio or watch list is >5% | a7 | qm |
| Is the market open? | a10 | qh |
| User age >22 | a11 | qa |

One of the rules identified as "qm" in the table 1 by the ranking server 114 is whether a percentage change in a stock quote of a stock portfolio the user 112A is greater than 5 percent. The user 112A creates the portfolio by logging into a user account that is managed by a server, e.g., an email server, the web server 116 (FIG. 1), etc., and providing ticker symbols to the server via an input device of the client device 118A (FIG. 1). Another one of the rules identified as "qh" in the table 1 by the ranking server 116 is whether a stock market is open and yet another one of the rules identified as "qa" in the table 1 by the ranking server 114 is whether the user 112A has an age greater than 22 years. The ranking server 114 obtains information regarding whether the stock market is open from a stock market server (not shown). In some embodiments, the user 112A logs into the social network after visiting the web page 102. The social network is accessed by the user 112A by logging into the social network via a field in one of the categories 1 thru 5 (FIG. 1). For example, the user 112A selects a field in one of the categories 1 thru 5 and the field indicates to the user 112A to log into the social network and upon receiving a selection of the field, a graphical user interface (GPU) of the client device 118A displays one or more fields in the category for receiving a username and a password to access a social network account of the user 112A. The user 112A provides his/her social network user name and/or password to the one or more fields that are displayed in one of the categories 1 thru 5 on the web page 102 to log into the social network. In various embodiments, instead of logging into the social network the user 112A logs into an email network or a game network in a manner similar to that of logging into the social network.

When a user logs into a network, e.g., a social network, an email network, a game network, etc., the web server 116 communicates with a network server (not shown) that creates and manages the network. Examples of the network server include a social network server, a game server, and an email server.

It should be noted that a rule is assigned a code by the ranking server 114. For example, a rule is identified using a logged value, e.g., a code, etc. The ranking server 114 does not parse a rule to determine a meaning, e.g., an English meaning, etc., of the rule. The ranking server 114 distinguishes and identifies different rules based on logged values and the logged values are independent of meanings of the rules.

Table 2 shows examples of various rules of a birthday card, which is a card that includes birthday information, e.g., birthday of the user 112A, birthdays of social network friends of the user 112A, etc., and is included on the web page 102.

TABLE 2

| Rule Description | Rule Shorthand | Logged Value/Code |
|---|---|---|
| Is there a friend with a birthday today? | a1 | bf |
| Is the user connected to a social network? | a2 | bc |

One of the rules identified as "bf" in the table 2 by the ranking server 114 is whether there is a social network friend of the user 112A having a birthday on the current day on which the web page 102 is accessed by the user 112A. Another one of the rules identified as "bc" in the table 2 by the ranking server 114 is whether the user 112A is connected to the social network. For example, the rule "bc" indicates whether the user 112A has a social network account of the social network.

Table 3 shows examples of various rules of the sports card, which is a card that includes sports information and is included on the web page 102.

TABLE 3

| Rule Description | Rule Shorthand | Logged Value/Code |
|---|---|---|
| Any user declared teams with live games? | a16 | sc |
| Any live games? | a18 | sl |
| Has the user declared any favorite teams? | a19 | sd |
| Any games scheduled to start in the next 60 minutes | a21 | ss |

One of the rules identified as "sc" in the table 3 by the ranking server 114 is whether any of the users 112A, 112B, and 112C has logged into his/her user account, e.g., an email account, a game account, a social network account, etc., to declare a team that is playing a game at a time the user visits the web page 102. Another one of the rules identified as "sl" in the table 3 by the ranking server 114 is whether any games are currently being played at a time the user 112A accesses the web page 102. Yet another one of the rules identified as "sd" in the table 3 by the ranking server 116 is whether any the users 112A, 112B, and 112C has logged into his/her user account, e.g., an email account, a game account, a social network account, etc., to declare his/her favorite team that is playing a game at a time the user visits the web page 102. Another one of the rules identified as "ss" in the table 3 by the ranking server 114 is whether any game is scheduled to start in a time period, e.g., 60 minutes, etc., from a time at which the user 112A visits the web page 102.

Table 4 shows examples of various rules of a weather card, which is a card that includes weather information and is included on the web page 102.

TABLE 4

| Rule Description | Rule Shorthand | Logged Value/Code |
|---|---|---|
| Forecasted bad weather on day +1 or day +2 | a22 | w3 |
| Current bad weather (rain, snow, sleet, tornado) | a23 | wt |
| >10% temp change from today to tomorrow or from tomorrow to the day after | a24 | w2 |
| <0930 user local time? | a25 | wh |

One of the rules identified as "w3" in the table 4 by the ranking server 114 is whether bad weather is forecasted for a day next to the current day on which the user 112A visits the web page 102 or on a day next to the next day on which the user 112A visits the web page 102. Another one of the rules identified as "wt" in the table 4 by the ranking server 114 is whether a weather on the current day on which the user 112A visits the web page 102 is bad, e.g., has rain, has snow, has sleet, has tornado, etc. Yet another one of the rules identified as "w2" in the table 4 by the ranking server 114 is whether there is a greater than a ten percent change in temperature forecasted for a day next to the current day on which the user 112A visits the web page 102 compared to a temperature on the current day or for a day next to the next day compared to the temperature forecasted for the next day. Another one of the rules identified as "wh" in the table 4 by the ranking server 114 is whether a time at a location of the user 112A is less than 9:30 AM. In some embodiments, the ranking server 114 receives a location of the user 112A from a global positioning system (GPS) of the client device 118A. The GPS device is connected to a processor of the client device 118A.

Table 5 shows examples of whether a relevance event, e.g., performance of a relevance action, occurrence of a relevance action, etc., has occurred with respect to each category of the web page 102 for a combination of features presented in the category.

TABLE 5

| Page view Event | Card | "True" Rules | "False" Rules | "Relevance" Event Occurred? |
|---|---|---|---|---|
| 1 | Finance | qm | qh, qa | Yes |
| 1 | Birthdays | | bc, bf | No |
| 1 | Sports | sd | ss, sl, sc | No |
| 1 | Weather | w2, wh, wt | w3 | Yes |
| 2 | Finance | | qm, qh, qa | No |
| 2 | Birthdays | bc, bf | | Yes |
| 2 | Sports | | sd, ss, sl, sc | No |
| 2 | Weather | wt | w2, w3, wh | No |
| 3 | Finance | qm, qh, qa | | Yes |
| 3 | Birthdays | bc | bf | No |
| 3 | Sports | sd, ss, sl, sc | | Yes |
| 3 | Weather | | w2, w3, wh, wt | No |

Table 5 shows relevance events based on multiple occurrences of relevance actions performed by the user 112A during multiple visits of the web page 102 by the user 112A on his/her client device 118A (FIG. 1). For example, a relevance event occurs with respect to the category 1 when a user selects a feature of the category 1 on the web page 102. The left most column in table 5 indicates a number of visits of the web page 102 by the user 112A. In some embodiments, the left most column in table 5 indicates a number of visits of the web page 102 by one or more of the users 112A, 112B, and 112C. In various embodiments, the leftmost column in table 5 indicates a number of visits by the user 112A of the web page 102 after logging into a user account of the user 112A. In several embodiments, the leftmost column in table 5 indicates a number of visits by one or more of the users 112A, 112B, and 112C of the web page 102 after logging into their corresponding user accounts.

The web server 116 receives a request for the web page 102 from one or more of the client devices 118A, 118B, and 118C. The request includes a URL of the web page 102. When the request is received, the web server 116 sends a web page 102 that is identified by a URL of the web page 102. Each time the web page 102 is sent to one of the client devices 118A, 118B, and 118C, the web server 116 indicates to the ranking server 114 that the web page 102 is sent to the one of the client devices 118A, 118B, and 118C. Each time the ranking server 114 receives the indication that the web page 102 is sent to one of the client devices 118A, the web page 102 is visited on the client device 118A by the user 112A.

During a first visit of the web page 102 by one of the users 112A, 112B, and 112C, it is determined by the ranking server 114 that an outcome of application of the rule "qm" by the ranking server 114 is true and an outcome of application of each rule "qh" and "qa" is false. It should be noted that as described herein, a true outcome of an application is a true rule state and a false outcome of the application of the rule is a false rule state. A feature that describes the rule "qm" is displayed in the finance card. For example, the ranking server 114 instructs the display device of the client device 118A to display a percentage change in a value of a stock in the stock portfolio of the user 112A is greater than 5 percent within the finance card on the web page 102. Moreover, in this example, the ranking server 114 instructs the display device of the client device 118A to display that a stock market is closed and that the user 112A is not greater than 22 years old. In some embodiments, the ranking server 114 does not instruct the display device of the client device 118A to display that the user 112A is not greater than 22 years old. In various embodiments, the ranking server 114 receives demographic information regarding a user, e.g., age of the user, birthday of the user, a place of residence of the user, a car that the user drives, a college that the user attended, etc., from a user account of the user. For example, the ranking server 114 sends a request to a social network server that manages a social network account of a user to receive the demographic information of the user.

Similarly, it should be noted that in various embodiments, information regarding a category is received by the ranking server 114 from a category server, e.g., the web server 116, etc., to apply to a rule regarding the information to further determine whether an outcome of application of the rule is true or false. For example, finance information is received from a finance server to apply to a rule regarding the finance information to further determine whether an outcome of application of the rule is true or false. Moreover, as another example, birthday information is received from a social network server to apply to a rule regarding the birthday information to further determine whether an outcome of application of the rule is true or false. As another example, sports information is received from a sports server to apply to a rule regarding the sports information to further determine whether an outcome of application of the rule is true or false. As another example, weather information is received from a weather server to apply to a rule regarding the weather information to further determine whether an outcome of application of the rule is true or false.

With reference back to the table 5, the ranking server 114 determines whether a relevance event has occurred with respect to the finance card during the first visit to the web page 102 when an outcome of application of the rule "qm" is true and outcomes of application of the rules "qh" and "qa" is false. For example, it is determined whether an indication is received from the client device 118A that the finance card displayed on the web page 102 is selected, or hovered over, or is viewed, or a combination thereof by the user 112A. The ranking server 114 stores a binary outcome indicating whether a relevance event occurred with respect to the finance card.

Similarly, for the first visit, the ranking server 114 determines whether a relevance event occurred with respect to the birthday card for a combination of outcomes of rules associated with the birthday card, whether a relevance event occurred with respect to the sports card for a combination of outcomes of rules associated with the sports card, and whether a relevance event occurred with respect to the weather card for a combination of outcomes of rules associated with the weather card.

Moreover, similarly, for each of second and third visits of the web page 102 by one of the users 112A, 112B, and 112C, the ranking server 114 determines whether a relevance event occurred with respect to the finance card for a combination of outcomes of rules associated with the finance card, whether a relevance event occurred with respect to the birthday card for a combination of outcomes of rules associated with the birthday card, whether a relevance event occurred with respect to the sports card for a combination of outcomes of rules associated with the sports card, and whether a relevance event occurred with respect to the weather card for a combination of outcomes of rules associated with the weather card.

Table 6 shows examples of relevance scores assigned by the ranking server 114 for true outcomes of different rule combinations of the finance card.

TABLE 6

| "True" Rules | "Relevance" Score |
|---|---|
| qa; qh; qm | 0.158851807 |
| qm | 0.148619885 |
| qh; qm | 0.03535678 |
| qa; qm | 0.098275372 |
| [NONE] | 0.112020269 |
| qa; qh | 0 |
| qa | 0.072486576 |

For example, the first row of table 6 indicates that when an outcome of each of the rules "qa", "qh", and "qm" is determined to be true by the ranking server 114, a relevance score of 0.158851807 is assigned by the ranking server 114 to the combination of the outcomes. As another example, the second row of table 6 indicates that when an outcome of the rule "qm" is determined to be true by the ranking server 114 and an outcome of each of the rules "qa" and "qh" is determined to be false by the ranking server 114, a relevance score of 0.148619885 is assigned by the ranking server 114 to the combination of the outcomes. As another example, the fifth row of table 6 indicates that when an outcome of each of the rules "qa", "qh", and "qm" is determined to be false by the ranking server 114, e.g., a "NONE" state, etc., a relevance score of 0.112020269 is assigned by the ranking server 114 to the combination of the outcomes.

Similarly, table 7 shows examples of relevance scores assigned by the ranking server 114 for true outcomes of different rule combinations of the birthday card, table 8 shows examples of relevance scores assigned by the ranking server 114 for true outcomes of different rule combinations of the sports card, and table 9 shows examples of relevance scores assigned by the ranking server 114 for true outcomes of different rule combinations of the weather card.

TABLE 7

| "True" Rules | "Relevance" Score | "True" Rules | "Relevance" Score |
|---|---|---|---|
| bc; bf | 0.332242571 | bc; bf | 0.332242571 |
| [NONE] | 0.005825557 | [NONE] | 0.005825557 |
| bc | 0.014350998 | bc | 0.014350998 |

TABLE 8

| "True" Rules | "Relevance" Score |
|---|---|
| sl; ss | 0.111123784 |
| ss | 0.074234198 |
| sl | 0.128281713 |
| [NONE] | 0.096694862 |
| sc; sd; sl; ss | 0.733111265 |
| sd | 0.481235878 |
| sc; sd; sl | 0.344772884 |
| sd; sl; ss | 0.182254603 |
| sd; ss | 0.192542401 |
| sd; sl | 0.246645084 |

TABLE 9

| "True" Rules | "Relevance" Score |
|---|---|
| w3 | 0.145901891 |
| w2; wh | 0.238893982 |
| [NONE] | 0.198962304 |
| w2 | 0.167498428 |
| w2; wh; wt | 0.352644269 |
| w2; wt | 0.306344527 |
| wh | 0.219689451 |
| w3; wh | 0.181063053 |
| wt | 0.259583214 |
| w3; wt | 0.284796078 |
| wh; wt | 0.705779536 |
| w3; wh; wt | 0.273387601 |

In some embodiments, a relevance value, e.g., a relevance score, etc., that is lower that a relevance value for the "NONE" state is an indicator to the ranking server 114 that a combination of outcomes of rules that is applied by the ranking server 114 to generate a relevance value lower than the relevance value corresponding to the "NONE" state is to be dropped by the ranking server 114. For example, the ranking server 114 determines that the relevance scores "0.145901891", "0.167498428", and "0.181063053" in table 9 are lower than the relevance score "0.198962304" for the "NONE" state. In this example, the ranking server 114 determines not to change an order of the weather card when it is determined by the ranking server 114 that an outcome of application of the rule "w3" is true, or that an outcome of application of the rule "w2" is true, or an outcome of application of each rule "w3" and "wh" is true. In various embodiments, the ranking server 114 determines to change an order of the weather card when it is determined by the ranking server 114 that an outcome of application of the rule "w3" is true, or that an outcome of application of the rule "w2" is true, or an outcome of application of each rule "w3" and "wh" is true.

Table 10 provides examples of relevance scores that are determined by the ranking server 114 for various page visits by the user 112A or by a number of the users 112A, 112B, and 112C after the finance card, the birthday card, the sports card, and the weather card are assigned a relevance score by the ranking server 114. For example, a first page visit in table 10 is that of the user 112A and a second page visit in table 10 is that of the user 112A, and both the visits are made after the finance card, the birthday card, the sports card, and the weather card are assigned a relevance score by the ranking server 114. As another example, the first page visit in table 10 is that of the user 112A and the second page visit in table 10 is that of the user 112B and both the visits are made after the finance card, the birthday card, the sports card, and the weather card are assigned a relevance score by the ranking server 114.

TABLE 10

| Page view Event | Card | "True" Rules | "False" Rules | "Relevance" Score |
|---|---|---|---|---|
| 1 | Finance | qm | qh, qa | 0.148619885 |
| 1 | Birthdays | | bc, bf | 0.005825557 |
| 1 | Sports | sd | ss, sl, sc | 0.481235878 |
| 1 | Weather | w2, wh, wt | w3 | 0.352644269 |
| 2 | Finance | | qm, qh, qa | 0.112020269 |
| 2 | Birthdays | bc, bf | | 0.332242571 |
| 2 | Sports | | sd, ss, sl, sc | 0.096694862 |
| 2 | Weather | wt | w2, w3, wh | 0.259583214 |
| 3 | Finance | qm, qh, qa | | 0.158851807 |
| 3 | Birthdays | bc | bf | 0.014350998 |

TABLE 10-continued

| Page view Event | Card | "True" Rules | "False" Rules | "Relevance" Score |
|---|---|---|---|---|
| 3 | Sports | sd, ss, sl, sc | | 0.733111265 |
| 3 | Weather | | w2, w3, wh, wt | 0.198962304 |

The ranking server 114 determines to place a card with the highest relevance score at the top of a column compared to cards that have relevance scores lower than the highest relevance score. For example, during the first page visit by the user 112A of the web page 102 after the finance, birthday, sports, and weather cards are assigned the relevance score by the ranking server 114, the ranking server 114 sends an instruction to the client device 118A (FIG. 1) to place the sports card at a top of a column of the web page 102, followed by placement of the weather card in the column in the web page 102, further followed by placement of the finance card in the column on the web page 102, and then followed by the birthday card in the column on the web page 102. As another example, during the second page visit by the user 112A of the web page 102 after the finance, birthday, sports, and weather cards are assigned the relevance score by the ranking server 114, the ranking server 114 sends an instruction to the client device 118A (FIG. 1) to place the birthday card at a top of a column of the web page 102, followed by placement of the weather card in the column in the web page 102, further followed by placement of the finance card in the column on the web page 102, and then followed by the sports card in the column on the web page 102. As yet another example, during the third page visit by the user 112A of the web page 102 after the finance, birthday, sports, and weather cards are assigned the relevance score by the ranking server 114, the ranking server 114 sends an instruction to the client device 118A (FIG. 1) to place the sports card at a top of a column of the web page 102, followed by placement of the weather card in the column in the web page 102, further followed by placement of the finance card in the column on the web page 102, and then followed by the birthday card in the column on the web page 102.

In various embodiments, each table 1 thru 10 is stored within a memory device of the ranking server 114.

Figure 4:
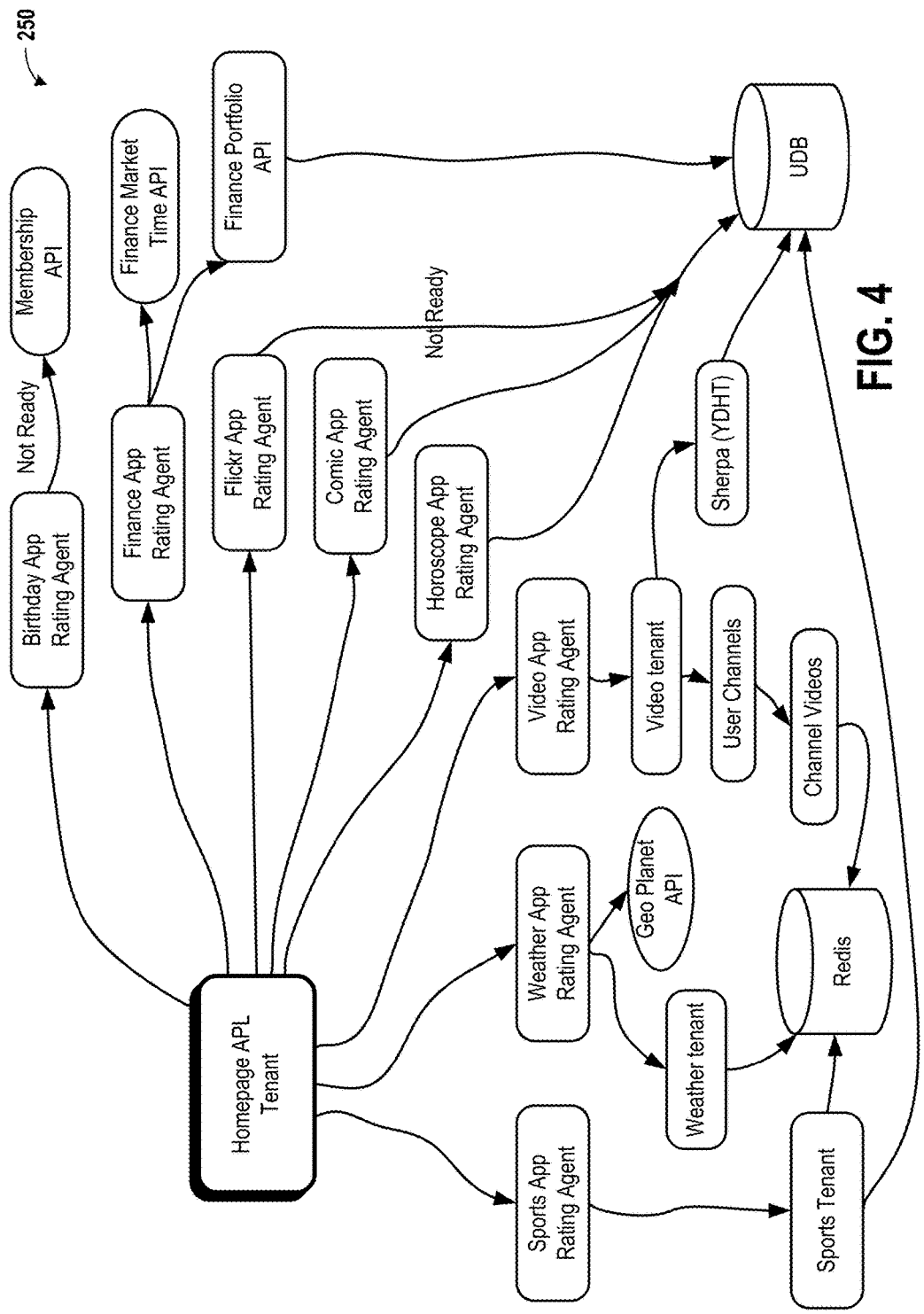
FIG. 4 is a diagram of an architecture of a rules system that executes a ranking of categories, in accordance with some embodiments described in the present disclosure.

FIG. 4 is a diagram of an embodiment of an architecture of a rules systems that executes a ranking of categories that are displayed on the web page 102. In some embodiments, the web page 102 is a home page that is displayed on the display device of the client device 118A when a programming language (APL) tenant is executed by a processor of the web server 116 (FIG. 1). The homepage APL tenant is executed to provide information regarding the web page 102 to the client devices 118A, 118B, and 118C. The homepage APL tenant receives sports information from a sport application rating agent, and/or receives weather information from a weather application rating agent, and/or receives video frames from a video application rating agent, and/or receives horoscope information from a horoscope application rating agent, and/or receives comic information from a comic application rating agent, and/or receives images from a photo application rating agent, and/or receives finance information from a finance application rating agent, and/or receives birthday information from a birthday application rating agent. Each agent is a computer program that acts for the homepage APL tenant.

The sports application rating agent communicates with a sports tenant that is executed by a processor of a sports server and the sports tenant retrieves sports information from a database and/or from a universal database to provide to the home page APL tenant via the sports application rating agent. Similarly, the weather application rating agent communicates with a weather tenant that is executed by a processor of a weather server and the weather tenant retrieves weather information from a database to provide to the homepage APL tenant via the weather application rating agent. The weather application rating agent retrieves identities of various places on Earth to provide to the weather tenant. The weather tenant then retrieves weather at the places from a database to provide to the homepage APL tenant.

The video application rating agent communicates with a video tenant that is executed by a processor of a video tenant and the video tenant communicates with a user channels computer program. The user channels computer program retrieves videos for a channel that is assigned to a user from a database and provides the videos via the channel to the homepage APL via the video application rating agent.

Moreover, in some embodiments, the video tenant accesses videos from the universal database via a cloud storage computing platform.

Also, the horoscope application rating agent accesses horoscope information from the universal database to provide to the homepage APL tenant. Similarly, the comic application rating agent accesses comic information from the universal database to provide to the homepage APL tenant, the photo application rating agent accesses photo information from the universal database to provide to the homepage APL tenant, and the finance application rating agent accesses finance information from the universal database to provide to the homepage APL tenant. The finance application rating agent also communicates with a finance market time application programming interface (API) to obtain real-time market information, e.g., stock market information, futures market information, currency market information, etc., via the finance market time API. The birthday application rating agent communicates with a membership API to receive membership information, e.g., username, password, etc., from a user.

Figure 5:
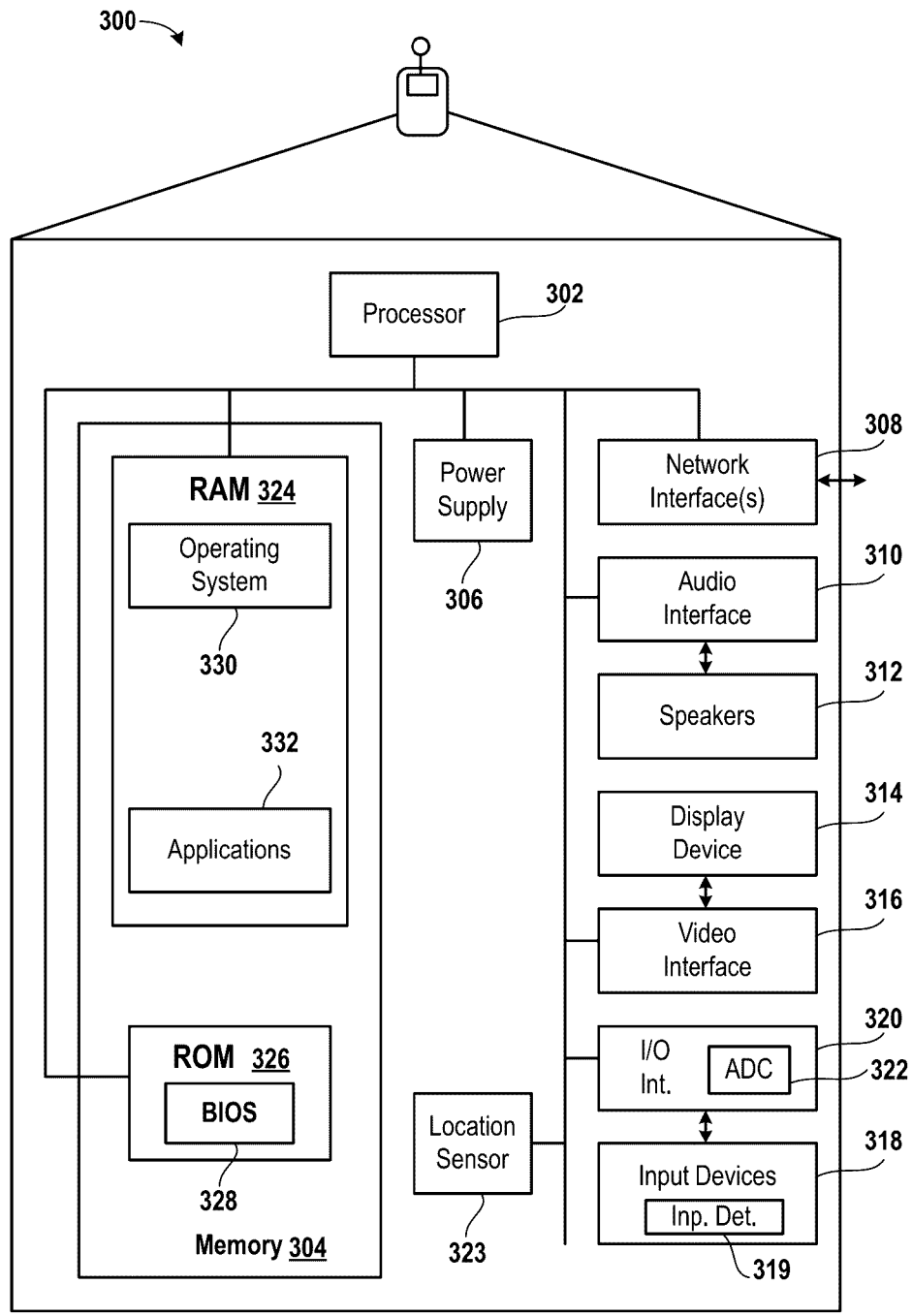
FIG. 5 is a diagram of a client device, in accordance with a number of embodiments described in the present disclosure.

FIG. 5 is a block diagram of an embodiment of client device 300 that may be included in a system implementing the invention. In some embodiments, the client device 300 includes more or less components than those shown in FIG. 6. The client device 300 is an example of any of the client devices 118A, 118B, and 118C (FIG. 1).

The client device 300 includes a processor 302 in communication with a memory device 304 via a bus. In some embodiments, the term processor is not limited to being a processor but also includes an application specific integrated circuit (ASIC), or a programmable logic device (PLD), or a central processing unit (CPU), or a microprocessor, or a combination thereof. Examples of a memory device include a read-only memory (ROM), a random access memory (RAM), a volatile memory, a non-volatile memory, a Flash memory, a redundant array of disks, etc. The client device 300 also includes a power supply 306, one or more network interfaces 308, an audio interface 310, a display device 314, a video interface 316, one or more input devices 318, an input/output (I/O) interface 320, and a location sensor, e.g., a GPS device, etc. The power supply 306 provides power to the client device 300. In one embodiment, a rechargeable or non-rechargeable battery is used to provide power. In some embodiments, the power is provided by an external power source, such as an alternating current (AC) adapter or a powered docking cradle that supplements and/or recharges a battery.

The client device 300 may optionally communicate with a base station (not shown), or directly with another client device. The network interface 308 includes circuitry for coupling client device 300 to one or more networks, e.g., the network 115 (FIG. 1), etc., and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), ultra wide band (UWB), Institute of Electrical and Electronics Engineers (IEEE) 802.16 Worldwide Interoperability for Microwave Access (WiMax), or any of a variety of other wireless communication protocols. The network interface 308 is sometimes known as a transceiver, transceiving device, or network interface card (NIC).

The audio interface 310 is arranged to provide audio data and/or receive audio signals, such as, a sound. For example, the audio interface 310 is coupled to speakers 312 that output audio signals. As another example, the audio interface 310 is coupled to a microphone to receive audio signals. In one embodiment, the speakers 312 convert audio data into audio signals. In some embodiments, audio interface 310 includes an analog-to-digital converter to convert audio signals into audio data.

The display device 314 may be a liquid crystal display (LCD), a plasma display, a light emitting diode (LED) display, or any other type of display used with a client device. In some embodiments, the display device 314 includes a touch sensitive screen arranged to receive input from an input device, such as a stylus, or from one or more fingers or from a combination of one or more fingers and a thumb of a user.

In one embodiment, instead of the processor 302 executing a renderer software program that converts multimedia data to display, such as render, the web page 102 (FIG. 1), categories, etc., the video interface 316 includes a GPU that performs the execution. In some embodiments, the renderer software program is stored in the memory device 304.

The input devices 308 include one or more input devices arranged to receive input from a user. For example, input devices 308 include an input detector 319, a mouse and a keyboard. Examples of the input detector 319 include a biometric sensor, e.g., a fingerprint sensor, an eye location detector, etc. The biometric sensor produce an electrical current when it scans a body part, e.g., eyes, fingers, thumb, etc., of a user, and the electrical current is converted to a digital form before being received by the processor 302 for analysis.

Client device 300 also includes the I/O interface 320 for communicating with external devices, such as a headset, or other input or output devices. In some embodiments, I/O interface 320 utilizes one or more communication technologies, such as universal serial bus (USB), infrared, Bluetooth™, or the like. In various embodiments, I/O interface 320 includes an analog-to-digital converter (ADC) 322.

The memory device 304 includes a RAM 324 and a ROM 326. The memory device 304 illustrates an example of computer-readable medium for storage of information such as computer-readable instructions, data structures, program modules or other data. The memory device 304 stores a basic input/output system ("BIOS") 328 for controlling low-level operation of client device 300. The memory device 304 also stores an operating system 330 for controlling an operation of the client device 300. It will be appreciated that in one embodiment, the operating system 330 includes UNIX, LINUX™, Android™ operating system, or Windows Mobile™ operating system.

The RAM 324 further includes applications 332 and/or other data. Applications 332 may include computer executable instructions which, when executed by client device 300, provide functions, such as, rendering, filtering, and analog-to-digital conversion. Examples of the applications 332 include a web browser application, an email application, a game application, a social network application, etc.

Examples of the location sensor 323 include a GPS transceiver, a mobile transceiver, etc. The location sensor 323 includes a device or circuit or logic that can generate geo-location data to determine a location of the client device 300.

Figure 6:
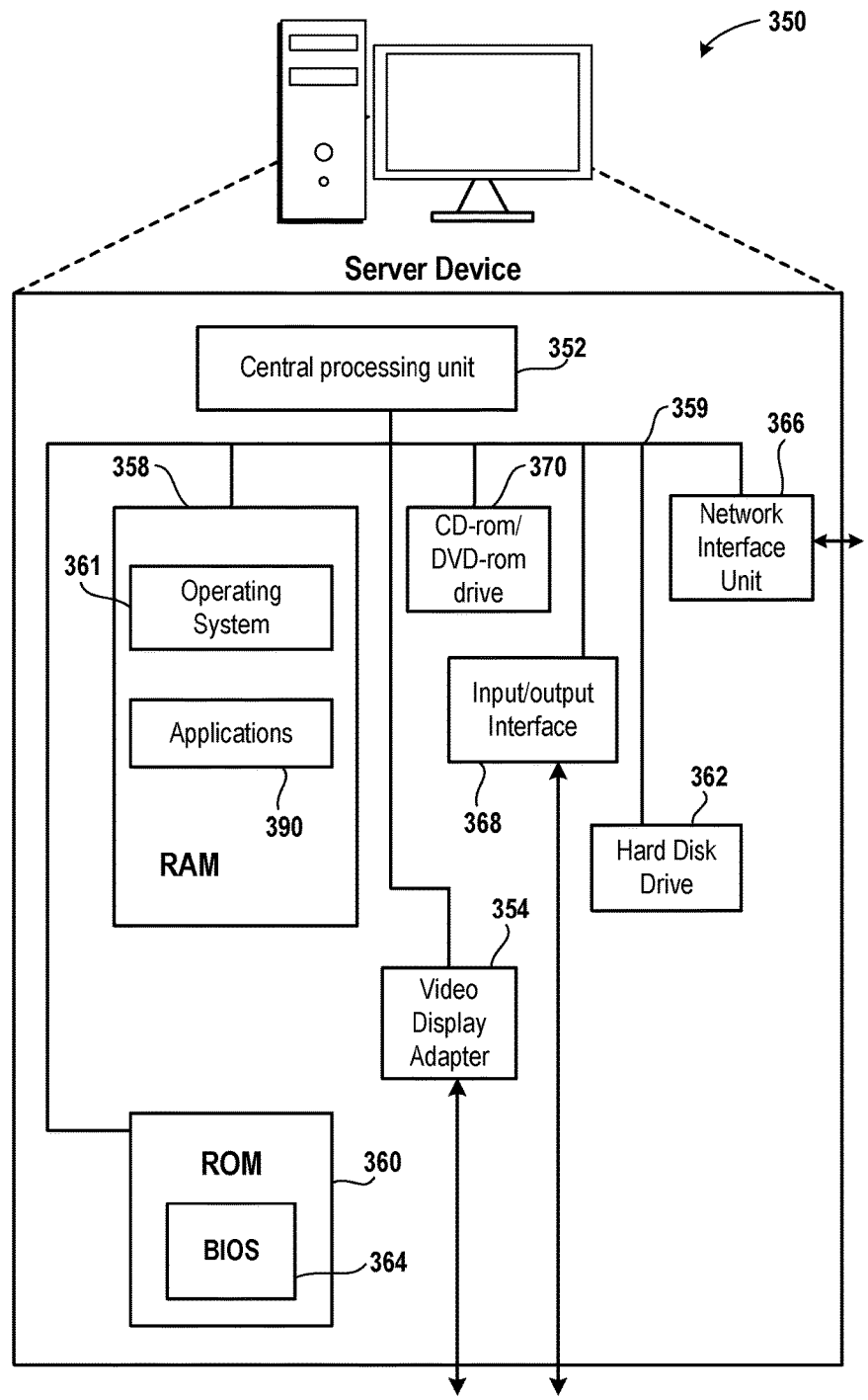
FIG. 6 is a diagram of a server device, in accordance with several embodiments described in the present disclosure.

FIG. 6 is a diagram of an embodiment of a server device 350. The server device 350 may include many more components than those shown. The server device 350 includes a CPU 352, a video display adapter 354, and a mass memory, all in communication with each other via a bus 359. The mass memory includes a RAM 358, a ROM 360, and one or more permanent mass storage devices, such as hard disk drive 362, a tape drive, an optical drive, and/or a floppy disk drive. The mass memory stores an operating system 361 for controlling an operation of the server device 350.

The mass memory as described above illustrates another type of a computer-readable medium. In some embodiments, a computer-readable medium includes volatile, nonvolatile, removable, and a non-removable memory medium implemented in any method or technology for storage of information, such as computer-readable instructions, data structures, program modules, or other data. Examples of a computer-readable medium include RAM, ROM, electrically erasable programmable ROM (EEPROM), flash memory or other memory technology, compact disc ROM, digital versatile disks (DVD), optical storage, magnetic cassettes, magnetic tape, magnetic disk storage, magnetic storage devices, or any other medium which can be used to store information which can be accessed by a processor.

The mass memory stores program code and data. One or more application computer programs 390 are loaded into the mass memory and run on the operating system 361. Examples of application computer programs 390 include email programs, schedulers, calendars, transcoders, database programs, word processing programs, web-based programs, server programs, spreadsheet programs, and so forth.

Likewise, in some embodiments, the server device 350 includes additional mass storage facilities, such as, a CD-ROM/DVD-ROM drive 370 and hard disk drive 362. The hard disk drive 362 is utilized by server device 350 to store, among other things, application programs, computer programs, databases, and the like.

A basic input/output system ("BIOS") 364 is also provided for controlling a low-level operation of the server device 350. The server device 350 also can communicate with the network 115 (FIG. 1) via a network interface unit 366, which is constructed for use with various communication protocols mentioned above, including a transmission control protocol/Internet protocol (TCP/IP) protocol. The network interface unit 366 is sometimes known as a transceiver, transceiving device, network interface card (NIC), and the like.

In some embodiments, the server device 350 includes a simple mail transfer protocol (SMTP) handler application for transmitting and receiving email. In various embodiments, the server device 350 includes an HTTP handler application for receiving and handing HTTP requests from one or more client devices 118A, 118B, 118C (FIG. 1), and an HTTPS handler application for handling secure connections. The HTTPS handler application initiates communication with an external application, e.g., a web browser, etc., residing on the client devices 118A, 118B, 118C in a secure fashion.

The server device 350 also includes an I/O interface 368 for communicating with external devices, such as a mouse, keyboard, scanner, or other input devices.

It should be noted that although some of the operations described above are performed by a single processor, in some embodiments, an operation is performed by multiple processors or multiple operations are performed by multiple processors.

In some embodiments, the operations described above as being performed by a server are being performed by one or more processors of the server.

In various embodiments, the operations described above as being performed by multiple servers are performed by one server. For example, the operations described above as being performed by the web server 116 and the ranking server 114 are performed by the ranking server 114.

In some embodiments, the operations described above as being performed by one server are performed by multiple servers.

It should be noted that although a majority of the above-described embodiments are described with respect to the web page 102 (FIG. 1), in some embodiments, instead of presenting categories on the web page 102, the categories are presented within a mobile application. In various embodiments, the mobile application is an application computer program that is executed by a processor of a mobile device, e.g., a smart phone, a tablet computer, etc. The mobile application is usually available through application distribution platforms.

Embodiments of the present disclosure may be practiced with various computer system configurations including hand-held devices, microprocessor systems, microprocessor-based or programmable consumer electronics, minicomputers, mainframe computers and the like. The embodiments may also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relates to a device or an apparatus for performing these operations. The apparatus may be specially constructed for a special purpose, such as a special purpose computer. When defined as the special purpose computer, a computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

One or more embodiments can also be fabricated as computer-readable code on a computer-readable medium. The computer-readable medium is any data storage device that can store data, which can be thereafter be read by a computer system. Examples of the computer-readable medium include hard drives, network attached storage (NAS), read-only memory, random-access memory, CD-ROMs, CD-recordables (CD-Rs), CD-rewritables (CD-RWs), magnetic tapes and other optical and non-optical data storage devices. The computer-readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method comprising:
  accessing multiple cards from a database, the multiple cards ranked in the database based on a test conducted on multiple users, the multiple cards associated with one or more rule states, the one or more rule states providing one or more binary outcomes of one or more rules, one of the one or more rules identified using a code, the test conducted by presenting different random sequences of the multiple cards to different ones of the multiple users and receiving inputs from the multiple users,
  wherein conducting the test comprises:
    determining whether one or more relevance actions are performed by the multiple users with respect to the multiple cards, the multiple cards displayed on a presentation area, the one or more rule states including the one or more binary outcomes of application of the one or more rules;
    for each combination of two or more features of the multiple cards, determining a relationship between a number of the one or more relevance actions to a number of visits of the presentation area by the multiple users; and
    ranking the multiple cards based on the relationship;
  receiving a request for the presentation area from a client device operated by a user, the presentation area for displaying the multiple cards in an order, the order determined based on the test; and
  providing the multiple cards for display in the order within the presentation area on the client device of the user in response to the request, wherein providing the multiple cards for display includes sending the multiple cards for display based on the ranking.

2. The method of claim 1, wherein the relationship includes a ratio of the number of the one or more relevance actions to the number of visits of the presentation area by the multiple users.

3. The method of claim 1, further comprising:
determining a binary outcome of the one of the one or more rules based on a demographic of the multiple users; and
determining a binary outcome of another one of the one or more rules based on one or more conditions of an environment.

4. The method of claim 3, wherein the environment includes a weather environment, or a sports environment, or a finance environment, or an image environment, or a videos environment, or a birthday environment, or a horoscopes environment, or a comics environment.

5. The method of claim 1, wherein the code assigned to one of the features is independent of a meaning of the one of the one or more rules.

6. The method of claim 1, wherein the presentation area includes a web page or a presentation area within a mobile application.

7. A method comprising:
receiving multiple cards, one of the multiple cards having multimedia content to be displayed on a presentation area, the multimedia content having one or more features, the multiple cards associated with one or more rules;
sending the multiple cards for arrangement on the presentation area in a random order for multiple users, the random order being different for different ones of the multiple users;
identifying user interactivity with the one or more features of the one of the multiple cards, the user interactivity with the one or more features in the one of the multiple cards sets a binary outcome for the one of the multiple cards; and
defining a ranking based on the binary outcome for the one of the multiple cards, wherein defining the ranking based on the binary outcome comprises:
for each combination of binary outcomes of rules associated with each of the multiple cards, determining whether a relevance event occurred based on the user interactivity, wherein the relevance event includes a click, or a hover, or a view, or a combination thereof;
for each combination of the binary outcomes of rules associated with each of the multiple cards, assigning a relevance score to each of the multiple cards based on a ratio of a number of relevance events on the presentation area received from the multiple users to a total number of page visits of the presentation area by the multiple users; and
assigning the ranking to the multiple cards based on the relevance score; and
sending for display the multiple cards ordered in accordance with the ranking defined based on the binary outcomes for the multiple cards,
wherein the method is executed by a processor.

8. The method of claim 7, wherein the binary outcome for the one of the multiple cards includes a true outcome or a false outcome, wherein one of the one or more rules is assigned the binary outcome.

9. The method of claim 7, wherein the multimedia content includes text, or photos, or videos, or animations, or audio, or a combination thereof.

10. The method of claim 7, wherein the presentation area includes a home page, wherein the home page is a page on a website.

11. The method of claim 7, wherein the one or more features include hyperlinks, wherein the one or more features include text, or photos, or videos, or animations, or audio, or a combination thereof.

12. The method of claim 7, wherein the one of the multiple cards is configured to receive a close selection from a user via an input device to close the one of the multiple cards on the presentation area, wherein upon receiving the close selection, a prompt to save the close selection in a user account is displayed, wherein upon receiving the close selection after the prompt, the one of the multiple cards that is closed is reopened on the presentation area, wherein the multimedia content of the one of the multiple cards is displayed having an increased size upon selecting the multimedia content.

13. The method of claim 7, wherein each of the multiple cards is displayed by executing a corresponding computer application.

14. The method of claim 7, wherein the random order includes a random sequence, the random sequence is created by a random number generator, wherein the random sequence includes multiple random numbers, wherein each random number is unknown before the random number is generated.

15. The method of claim 7, wherein the multiple users operate a plurality of client devices, or have a plurality of user accounts, or a combination thereof.

16. The method of claim 7, wherein the user interactivity includes a click by a user, or a hover by the user, or a view by the user, or a combination thereof.

17. The method of claim 7, wherein the ranking defines an arrangement of the multiple cards on a display device of a client device.

18. The method of claim 7, wherein the multiple cards include categories, the categories including weather, or finance, or sports, or images, or videos, or birthdays, or comics, or horoscopes, or a combination thereof.

19. A method for arranging multiple categories, the method comprising:
receiving the multiple categories, the multiple categories to be presented on a presentation area, one of the multiple categories different than another one of the multiple categories, each of the multiple categories for presentation of a combination of features, the multiple categories associated with multiple combinations of binary outcomes of multiple combinations of rules;
sending for display to multiple client devices the multiple categories, each of the multiple categories is associated with a corresponding one of the multiple combinations of binary outcomes;
determining a number of the multiple client devices from which indications of relevance actions are received when the multiple categories based on the multiple combinations of binary outcomes are presented on the multiple client devices; and
ranking the multiple categories for presentation on the presentation area based on the number of the multiple client devices from which the indications of the relevance actions are received,
wherein the method is executed by a processor.

20. The method of claim 19, wherein ranking the multiple categories for presentation on the presentation area based on the number of multiple client devices from which the indications of the relevance actions are received comprises:

determining a ratio of the number of multiple client devices from which the indications of the relevance actions are received to the number of multiple client devices on which the multiple categories are displayed; and ranking the multiple categories based on the ratio.

21. The method of claim 19, wherein one of the relevance actions includes hovering on one of the features presented based on the binary outcomes using a pointer, or selecting one of the features presented based on the binary outcomes using the pointer, or viewing one of the features presented based on the binary outcomes, or a combination thereof.

22. The method of claim 19, wherein the multiple categories including weather, or finance, or sports, or images, or videos, or birthdays, or comics, or horoscopes, or a combination thereof.

23. A server comprising:

a memory device for storing a computer program; and a processor coupled to the memory device for retrieving the computer program from the memory device and executing the computer program, the processor executing the computer program for:

receiving multiple cards, one of the multiple cards having multimedia content to be displayed on a presentation area, the multimedia content having one or more features, the multiple cards associated with one or more rules;

sending the multiple cards for arrangement on the presentation area in a random order for multiple users, the random order being different for different ones of the multiple users;

identifying user interactivity with the one or more features of the one of the multiple cards, the user interactivity with the one or more features in the one of the multiple cards sets a binary outcome for the one of the multiple cards;

defining a ranking based on the binary outcome, wherein to define the ranking based on the binary outcome:

for each combination of binary outcomes of rules associated with each of the multiple cards, determining whether a relevance event occurred based on the user interactivity, wherein the relevance event includes a click, or a hover, or a view, or a combination thereof;

for each combination of the binary outcomes of rules associated with each of the multiple cards, assigning a relevance score to the one of the multiple cards based on a ratio of a number of relevance events on the presentation area received from the multiple users to a total number of page visits of the presentation area by the multiple users; and assigning a rank to the multiple cards based on the relevance score; and sending for display the multiple cards ordered in accordance with the rank defined based on the binary outcomes for the multiple cards.

* * * * *